US008268921B2

(12) United States Patent
Cochet et al.

(10) Patent No.: US 8,268,921 B2
(45) Date of Patent: Sep. 18, 2012

(54) ELASTOMERIC COMPOSITION COMPRISING FUNCTIONALIZED BUTADIENIC ELASTOMERS AND HIGH DISPERSIBLE ALUMINIUM-BASED SILICA

(75) Inventors: Philippe Cochet, Lyons (FR); Dominique Petit, Saint-Cyr Au Mont D'or (FR); Toshihiro Tadaki, Yokkaichi (JP); Naokazu Kobayashi, Suzuka (JP)

(73) Assignees: Rhodia Chimie, Auberbilliers (FR); JSR Corporation, Tokyo (JP)

( * ) Notice: Subject to any disclaimer, the term of this patent is extended or adjusted under 35 U.S.C. 154(b) by 0 days.

(21) Appl. No.: 11/794,098

(22) PCT Filed: Dec. 22, 2005

(86) PCT No.: PCT/EP2005/013885
§ 371 (c)(1),
(2), (4) Date: Oct. 16, 2008

(87) PCT Pub. No.: WO2006/066922
PCT Pub. Date: Jun. 29, 2006

(65) Prior Publication Data
US 2009/0076210 A1    Mar. 19, 2009

(30) Foreign Application Priority Data
Dec. 23, 2004    (EP) .................................... 04293106

(51) Int. Cl.
*B60C 1/00* (2006.01)
*C08K 3/34* (2006.01)
*C08K 3/36* (2006.01)
*C09C 1/30* (2006.01)

(52) U.S. Cl. ........ 524/492; 524/493; 524/494; 106/492; 106/483; 423/335; 423/339

(58) Field of Classification Search ................ 524/492, 524/493, 494; 106/492, 493; 423/335, 339
See application file for complete search history.

(56) References Cited

U.S. PATENT DOCUMENTS

| | | |
|---|---|---|
| 5,852,099 A | 12/1998 | Vanel |
| 5,876,494 A | 3/1999 | Bomal et al. |
| 6,127,472 A * | 10/2000 | Kobayashi et al. ............ 524/492 |
| 6,221,149 B1 * | 4/2001 | Bomal et al. .................. 106/492 |
| 6,362,272 B1 * | 3/2002 | Tadaki et al. .................. 524/555 |
| 6,702,888 B2 * | 3/2004 | Bomal et al. .................. 106/492 |
| 2001/0036991 A1 | 11/2001 | Robert et al. |
| 2003/0066459 A1 | 4/2003 | Bomal et al. |

FOREIGN PATENT DOCUMENTS

EP    0916699    5/1999
* cited by examiner

Primary Examiner — James J Seidleck
Assistant Examiner — Deve E Valdez
(74) Attorney, Agent, or Firm — SNR Denton US LLP

(57) ABSTRACT

The instant invention relates to elastomeric compositions especially useful for manufacturing articles for tires which comprise: (1) at least one butadienic elastomer E, containing a functionalized butadienic elastomer prepared in solution, and modified by a polyfunctional alkoxy silane coupling agent; and (2) a specific precipitated silica having high dispersibility properties and containing aluminum, as at least one reinforcing filler in said butadienic elastomer.

35 Claims, No Drawings

ELASTOMERIC COMPOSITION COMPRISING FUNCTIONALIZED BUTADIENIC ELASTOMERS AND HIGH DISPERSIBLE ALUMINIUM-BASED SILICA

CROSS REFERENCE TO PRIORITY APPLICATIONS

This application is the United States national phase of International Application No. PCT/EP2005/013885, filed Dec. 22, 2005, published in English as International Publication No. WO 2006/066922 A2 on Jun. 29, 2006, and claims priority of European Application No. 04293106.3, filed Dec. 23, 2004, each hereby expressly incorporated by reference in its entirety and each assigned to the assignee hereof.

The instant invention relates to elastomeric compositions comprising precipitated silica as reinforcing filler, which are especially useful for manufacturing articles for tires, such as vulcanized rubber article for tires, and in particular for manufacturing tire treads. These elastomeric compositions exhibit excellent low rolling resistance properties, together with acceptable (and generally good) grip properties, and very good abrasion resistance. These compositions further exhibit a good processability, especially due to their low viscosity.

It is commonly known that an elastomeric composition intended for use in tires, and especially in tire treads, should exhibit a rolling resistance as low as possible, especially so as to reduce the fuel consumption of the vehicle equipped with the tires.

In order to reduce this rolling resistance, the energy loss at a low frequency should be decreased. Indeed, when a vehicle runs, an external force is applied to the tires, the frequency of which depends on the speed of the vehicle and of the diameter of tires, and which is generally of about several tens of Hz. Tires have generally a temperature of 50-70° C. during this operation. The smaller the energy loss under the low frequency conditions at the above temperature, the lower the fuel consumption.

Therefore, the concept of "energy loss under low frequency conditions" is commonly used as an index for evaluating a elastomeric composition, such as a vulcanized rubber, as regards the rolling resistance and the fuel consumption under practical service conditions of tires. In that respect, the rolling resistance of an elastomeric composition is commonly evaluated by the so-called "loss tangent angle at 70° C." (or "tan $\delta$ at 70° C.", wherein "tan $\delta$" indicates an energy loss). The smaller the "tan $\delta$ at 70° C.", the lower the rolling resistance (and thus the lower the fuel consumption).

On the other hand, so as to insure traveling stability of the vehicles equipped with tires, a material for tires advantageously increases the frictional resistance of tires on a wet road surface (wet grip) and the frictional resistance on a dry road surface (dry grip).

To increase the grip of tires on a road surface (particularly on a wet road surface) an energy loss of vulcanized rubber at high frequency should be increased. Indeed, when a vehicle brakes, the tires (especially the tread) receive an external force at a high frequency (on the order of several tens of thousands to several hundred thousands Hz) due to the invisible irregularity of the road surface at a temperature of 50-70° C. The larger the energy loss at this temperature under the high frequency conditions, the higher the grip power of the tires.

Thus, the concept of "an energy loss of vulcanized rubber under high frequency conditions" can be utilized as an index for evaluation of the vulcanized rubber relating to the grip power in the practical service conditions of tires. Because it is difficult to obtain a testing machine to measure the energy loss under such high frequency conditions, this cannot be used as a laboratory index of vulcanized rubber relating to grip power as is. Because of this, the frequency is converted into a temperature (under the conditions that the frequency is decreased and the temperature is lowered according to decrease in the frequency) to measure the so-called "loss tangent angle at 0° C." ("tan $\delta$ at 0° C."), which is regarded as the laboratory index of vulcanized rubber relating to grip power. The larger the value of "tan $\delta$ at 0° C.", the better the performance of the tires in terms of grip power.

In the general case, it is difficult to produce an elastomeric composition intended for a use in tires, which has simultaneously sufficiently low rolling resistance and high grip properties (especially sufficient high wet skid properties). Generally, when decreasing rolling resistance, grip properties also decrease. Conversely, in most cases, ameliorating the grip properties increase rolling resistance.

Nevertheless, a few specific elastomeric compositions has been developed, which exhibit both good rolling resistance and good grip properties. Among these compositions, specific compositions of the type disclosed in EP 916 699 exhibit especially good properties. This kind of compositions has excellent low rolling resistance and high wet skid properties. Besides, especially when including fillers such as precipitated silica, elastomeric compositions of the type of EP 916 699 further exhibit very good wear resistance. Such a good wear resistance is a great advantage for an elastomeric composition, especially since it allows to reduce the thickness of the tread, and therefore the weight of the tire, which induces a further reduction of fuel consumption.

It has now been discovered that, when using specific precipitated silica as a reinforcing filler in composition of the type of those disclosed in EP 916 699, that is when using certain precipitated silica having high dispersibility properties and containing aluminum, the rolling resistance properties of the elastomeric composition are improved (i.e. the rolling resistance become lower), which may be e.g. observed by a decrease of the "tan $\delta$ at 70° C." value of the composition.

The inventors have found that, surprisingly, despite of this decrease of the rolling resistance, good grip properties (and especially good wet skid properties) are not significantly affected, or are even maintained. In other words, with the specific precipitated silica used, when the "tan $\delta$ at 70° C." value of the composition decrease, its "tan $\delta$ at 0° C." value is maintained at a sufficiently high level to be acceptable for an use for the manufacture of a tire article, such as a tire tread. In most cases, the grip properties are even very satisfying for such an application.

Besides, the use of the above specific precipitated silica with high dispersibility properties and comprising aluminium as reinforcing filler leads to composition having particularly high wear resistance (and especially abrasion resistance).

Moreover, it has been observed that the use of these specific precipitated silica having high dispersibility properties and containing aluminum leads to a further unexpected effect in a composition of the type described in EP 916 699. As a matter of fact, in such a composition, when precipitated silica is used as reinforcing filler, it is necessary, in the general case, to implement a coupling agent, e.g. a silane, in order to reduce the viscosity of the composition, especially to improve its processability. The inventors have now evidenced that, with precipitated silica with high dispersibility properties and containing aluminum, the quantity of coupling agent to be implemented in a composition of the type of EP 916 699 is considerably decreased for obtaining a given viscosity, in comparison with the contents to be used with usual silica reinforcing fillers. This decrease of the necessary amount of coupling agent when using a highly dispersible precipitated silica with a sufficient aluminum content in an elastomeric composition has previously been observed, and described in the general case. However, the inventors have discovered that this effect is surprisingly highly marked in a composition of the type of the compositions of EP 916 699.

This possibility of decreasing the amount of coupling agent such as silane has many advantages.

First, it should be stressed that coupling agents such as silanes are costly compounds. Therefore, the possibility of limiting their content is if obvious economical interest.

Besides, coupling agents of silane type exhibit toxicological disadvantage, related to ethanol emission by hydrolysis reaction between silane and free water, which occurs for example during mixing operation implemented when incorporating silica in the elastomeric composition.

Last, but not the least, the inventors have evidenced that, with low contents of coupling agents, the improvement of the decrease of the rolling resistance properties observed with silica with high dispersibility properties and sufficient aluminium content is particularly high. In that respect, it seems that a reduction of the content of coupling agents induce a further decrease of the rolling resistance (and especially a diminution of the "tan δ at 70° C." value). The inventors have especially observed that this reduction of the rolling resistance is particularly marked when the weight ratio coupling agent/silica is of about 4%.

On the basis of the above results, an object of the instant invention is to provide an elastomeric composition comprising a precipitated silica exhibiting excellent low rolling resistance, together with acceptable or preferably good grip properties and wear resistance, which is particularly suitable for the manufacture of articles for tires, and in particular for manufacturing low fuel consumption tire treads.

In this scope, the invention specifically aims at providing compositions of this type, with a reduced viscosity and wherein the content of coupling agents such as silanes is as low as possible.

These object are reached by elastomeric compositions which comprise:
(1) at least one butadienic elastomer E, which contains (in most cases in an amount of at least 35% by weight, said amount being preferably of at least 50% by weight, more preferably of at least 80% by weight, based on the total weight of butadienic elastomers in the composition), a functionalized butadienic elastomer prepared in solution, which is modified by at least one polyfunctional coupling agent having an alkoxy silane group, said polyfunctional coupling agent being advantageously an alkoxy silane compound, an alkoxy silane sulfide compound or a polyfunctional coupling agent having the following general formula (I):

wherein
each X group independently denotes a halogen atom, preferably a chlorine, bromine or iodine atom;
each R group independently denotes a hydrocarbon group (e.g. an alkyl group) having 1 to 20 carbon atoms, and preferably having at least 4 carbon atoms, wherein each —OR group preferably denotes a non-hydrolyzable alkoxy group;
each R' group independently denotes a group selected from an alkyl group having 1 to 20 carbon atoms, an halogenated alkyl group having 1 to 20 carbon atoms and an aryl group having 6 to 20 carbon atoms;
m denotes 1, 2, 3 or 4 and n denotes 0, 1 or 2, with the proviso that the sum (m+n) is 2, 3 or 4;
and
(2) a specific precipitated silica having high dispersibility properties and containing aluminium, as at least one reinforcing filler in said butadienic elastomer.

According to a first aspect, one of the subject of the instant invention is an elastomeric composition (C1) containing said at least one butadienic elastomer E as defined above, which contains a precipitated silica S1 as at least one reinforcing filler,
wherein said precipitated silica S1 is obtainable by a process including a precipitation reaction of a silicate with an acidifying agent, whereby a suspension of precipitated silica is obtained, and then the separation and the is drying of this suspension,
wherein:
the precipitation reaction is carried out in the following manner:
(i.1) an initial base stock comprising a silicate and an electrolyte is formed, the silicate concentration (expressed as $SiO_2$) in said initial base stock being lower than 100 g/l, and the electrolyte concentration in said initial base stock being lower than 17 g/l;
(ii.1) acidifying agent is added to the said base stock until a pH value of the reaction mixture of at least approximately 7 is obtained,
(iii.1) acidifying agent and a silicate are added simultaneously to the reaction mixture,
a suspension which has a solids content of not more than 24% by weight is dried,
and
the said process further including one of the following steps (a1) or (b1):
(a1) after stage (iii.1), at least one aluminium compound A and then a basic agent are added to the reaction mixture, and the said separation comprises a filtration and disintegration of the cake originating from this filtration, said disintegration being performed in the presence of at least one aluminium compound B,
(b1) after stage (iii.1) a silicate and at least one aluminium compound A are added simultaneously to the reaction mixture and, when the said separation comprises a filtration and disintegration of the cake originating from this filtration, the disintegration is preferably performed in the presence of at least one aluminium compound B.

The precipitated silica S1 present in composition (C1) is generally effectively prepared by the above described process. Especially in that case, this specific silica S1 has a remarkable dispersibility in the elastomer E, which is due to the specific implementation of the process as disclosed above, which implements a specific introduction of aluminium, a low concentration of silicate and electrolyte in the initial base stock and an appropriate solids content of the suspension to be dried.

The process of preparation of the silica S1 as defined above is a process for the synthesis of precipitated silica, wherein an acidifying agent is reacted with a silicate in very special conditions.

The choice of the acidifying agent and of the silicate may be made in a manner which is well known per se.

Thus, the acidifying agent generally employed is a strong inorganic acid such as sulphuric acid, nitric acid or hydrochloric acid, or an organic acid such as acetic acid, formic acid or carbonic acid. Independently from its exact nature, the acidifying agent may be dilute or concentrated; and its normality may be between 0.4 and 36 N, for example between 0.6 and 1.5 N. In particular, in the case where the acidifying agent is sulphuric acid, its concentration may be between 40 and 180 g/l, for example between 60 and 130 g/l.

As regards the silicate, it is possible to employ any common form of silicates such as metasilicates, disilicates and advantageously an alkali metal silicate, especially sodium or potassium silicate. The silicate may exhibit a concentration, expressed as silica, of between 40 and 330 g/l, for example between 60 and 300 g/l, in particular between 60 and 250 g/l. In the case where sodium silicate is employed, the latter generally exhibits an $SiO_2/Na_2O$ weight ratio of between 2 and 4, for example between 3.0 and 3.7.

In general, sulphuric acid is employed as the acidifying agent, and sodium silicate as the silicate.

The process of preparation of S1 is operated in a specific manner, according to the following stages.

First, a base stock is formed which includes some silicate and an electrolyte (stage (i.1)). The quantity of silicate present in the initial base stock advantageously represents only a part of the total quantity of silicate introduced into the reaction.

In stage (i.1), the concentration of electrolyte in the initial base stock is higher than 0 g/l and lower than 17 g/l, preferably lower than 14 g/l. In the sense of the instant specification, the term "electrolyte" is understood in its normal accepted meaning, that is to say that it denotes any ionic or molecular substance which, when in solution, decomposes or dissociates to form ions or charged particles. An electrolyte which may be mentioned is a salt from the group of the alkali and alkaline-earth metal salts, especially the salt of the metal of the starting silicate and of the acidifying agent, for example sodium sulphate in the case of the reaction of a sodium silicate with sulphuric acid.

The silicate concentrate in the initial base stock is higher than 0 g/l, e.g. of at least 10 g/l, and lower than 100 g of $SiO_2$ per liter. This concentration is preferably lower than 90 g/l, especially lower than 85 g/l. In some cases it may be lower than 80 g/l.

The second stage of the process of preparation of S1 consists in adding the acidifying agent to the base stock of composition described above (stage (ii.2)). This addition, which entails a corresponding lowering in the pH of the reaction mixture, takes place until a pH value of at least approximately 7, generally between 7 and 8, is reached.

Once the desired pH value of stage (ii.1) is reached, a simultaneous addition (stage (iii.1)) of acidifying agent and of silicate is then carried out. Advantageously, this simultaneous addition is carried out so that the pH value is continuously equal (to within +/−0.1) to the pH value reached at the end of stage (ii).

The process of preparation of S1 further includes one of the two operations, (a1) or (b1) mentioned above.

According to a first embodiment, the process of preparation of S1 includes the operation (a1).

In that case, the following successive stages (iv.1), (v.1) and (vi.1) are advantageously performed, preferably after having carried out the precipitation according to the stages (i.1), (ii.1) and (iii.1):

(iv.1) at least one aluminium compound A is added to the reaction mixture (that is to say to the reaction suspension or slurry obtained), (v.1) a basic agent is added to the reaction mixture preferably until a pH value of the reaction mixture of between 6.5 and 10, in particular between 7.2 and 8.6, is obtained, (vi.1) acidifying agent is added to the reaction mixture, preferably until a pH value of the reaction mixture of between 3 and 5, in particular between 3.4 and 4.5, is obtained.

After the simultaneous addition of stage (iii.1) it may then be advantageous to perform a maturing of the reaction mixture, it being possible for this maturing to last, for example, from 1 to 60 minutes, in particular from 3 to 30 minutes.

In this first embodiment of the process for preparing S1, it is desirable, between stage (iii.1) and stage (iv.1), and especially before the said optional maturing, to add an additional quantity of acidifying agent to the reaction mixture. This addition is generally done until a pH value of the reaction mixture of between 3 and 6.5, in particular between 4 and 6, is obtained.

The acidifying agent employed during this addition is generally identical with that employed during stages (ii.1), (iii.1) and (vi.1)

A maturing of the reaction mixture is usually performed between stage (v.1) and (vi.1), for example for 2 to 60 minutes, in particular for 5 to 45 minutes. Similarly, a maturing of the reaction mixture is in most cases performed after stage (vi.1), for example for 2 to 60 minutes, in particular for 5 to 30 minutes.

The basic agent employed during stage (iv) may be a solution of aqueous ammonia or, preferably, a solution of sodium hydroxide (or soda).

According to a second embodiment, the process of preparation of S1 includes the operation (b). In that case, a stage (vii.1) is performed after the stages (i.1), (ii.1) and (iii.1) described previously, which consists in adding a silicate and at least one aluminium compound A simultaneously to the reaction mixture.

After the simultaneous addition of stage (vii.1), it may then be advantageous to perform a maturing of the reaction mixture, it being possible for this maturing to last, for example, from 2 to 60 minutes, in particular from 5 to 30 minutes.

In this second alternative form, it is desirable, after stage (vii.1), and especially after this optional maturing, to add an additional quantity of acidifying agent to the reaction mixture. This addition is generally done until a pH value of the reaction mixture of between 3 and 6.5, in particular between 4 and 6, is obtained. The acidifying agent employed during this addition is generally identical with that employed during stages (ii.1) and (iii.1).

A maturing of the reaction mixture is usually performed after this addition of acidifying agent, for example for 1 to 60 minutes, in particular for 3 to 30 minutes.

The aluminium compound A employed in the process of preparation of S1 is generally an organic or inorganic aluminium salts. By way of examples of an organic salt there may be mentioned especially the salts of carboxylic or polycarboxylic acids, like the salts of acetic, citric, tartaric or oxalic acid. By way of examples of an inorganic salt there may be mentioned especially halides and oxyhalides (like chlorides and oxychlorides), nitrates, phosphates, sulphates and oxysulphates.

In practice, the aluminium compound A may be employed in the form of a solution, generally aqueous.

An aluminium sulphate is preferably employed as aluminium compound A.

In the preparation of S1, the temperature of the reaction mixture is generally between 70 and 98° C. According to a specific embodiment, the reaction is performed at a constant temperature of between 75 and 96° C. According to another preferred embodiment, the temperature at the end of the reaction is higher than the temperature at the beginning of reaction; the temperature at the beginning of the reaction is thus maintained preferably between 70 and 96° C. and the temperature is then raised over a few minutes, preferably up to a value of between 80 and 98° C., which value it is maintained until the end of the reaction; the operations (a) or (b) are thus usually performed at this constant temperature value.

In the process of preparation of S1, the suspension obtained at the outcome of the precipitation reaction (silica slurry) is submitted to a liquid-solid separation.

When the process of the preparation of S1 includes the operation (a1), the liquid-solid separation comprises a filtration (followed by washing if necessary) and a disintegration, the said disintegration being performed in the presence of at least one aluminium compound B and, preferably, in the presence of an acidifying agent as described above (in this latter case the aluminium compound B and the acidifying agent are advantageously added simultaneously).

The disintegration operation, which may be carried out, for example, by passing the filter cake through a mill of the colloid or bead type, makes it possible in particular to lower the viscosity of the suspension to be subsequently dried.

When the process of the preparation of S1 includes the operation (b1), the separation also comprises, in general, a filtration (followed by washing if necessary) and a disintegration, the said disintegration being preferably performed in the presence of at least one aluminium compound B and, in general, in the presence of an acidifying agent as described above (in this latter case the aluminium compound B and the acidifying agent are advantageously added simultaneously).

The aluminium compound B is usually different from the aluminium compound A. Compound B is generally selected from alkali metal aluminate, especially potassium aluminate, or, very preferably, sodium aluminate.

The precipitated silica S1 used in compositions (C1) preferably contains at least 0.45%, and preferably of at least 0.50%, for example between 0.50 and 1.50%, or even between 0.75 and 1.40%, by weight of aluminium. Therefore, the quantities of the aluminium compounds A and B to be used in the process of preparation of S1 are preferably chosen so as to reach an aluminium content in these ranges.

The separation used in the process of preparation of S1 usually includes a filtration performed by means of any suitable method, for example by means of a belt filter, a rotary vacuum filter or, preferably, a filter press.

The suspension of precipitated silica thus recovered (filter cake) is then dried. According to one characteristic of the process of preparation of S1, this suspension must exhibit, immediately before its drying, a solids content of not more than 24% by weight, preferably not more than 22% by weight.

The drying step of the process of preparation of S1 may be done according to any method that is known per se. However, it is preferably performed by spraying. Any suitable type of sprayer may be employed for this purpose, especially a turbine, nozzle, liquid-pressure or two-fluid sprayer.

Preferably, the suspension to be dried has a solids content higher than 15% by weight, preferably higher than 17% by weight and, for example, higher than 20% by weight. The drying is then preferably performed by means of a nozzle sprayer. The precipitated silica S1 obtainable according to this embodiment of the invention, and preferably by using a filter press, is advantageously in the form of substantially spherical beads, preferably of a mean size of at least 80 µm. Such specific precipitated silica is particularly advantageous in the composition (C1) of the invention.

In the general case, it should be noted that dry material, for example silica in pulverulent form, may be also added to the filter cake after the filtration, at a subsequent stage of the process of preparation of S1.

At the end of the drying, a stage of milling may be undertaken on the product recovered, especially on the product obtained by drying a suspension which has a solids content higher than 15% by weight. The precipitated silica which is then obtainable is generally in the form of a powder, preferably with a mean size of at least 15 µm, in particular between 15 and 60 µm, for example between 20 and 45 µm. The milled products with the desired particle size can be separated from any nonconforming products by means, for example, of vibrating screens which have appropriate mesh sizes, and the nonconforming products thus recovered can be returned to the milling.

Similarly, according to another embodiment of the invention, the suspension to be dried has a solids content of at most 15% by weight. The drying is then generally performed by means of a turbine sprayer. The precipitated silica S1 obtainable according to this embodiment of the invention, and preferably by using a rotary vacuum filter, is generally in the form of a powder, preferably with a mean size of at least 15 µm, in particular between 30 and 150 µm, for example between 45 and 120 µm.

According to a second aspect, another subject of the instant invention is an elastomeric composition (C2) containing the at least one butadienic elastomer E as defined above, which contains a precipitated silica S2 as at least one reinforcing filler, wherein said precipitated silica S2 is obtainable by a process of the type including the reaction of a silicate of alkali metal M with an acidifying agent whereby a suspension of precipitated silica is obtained, then the separation and the drying of this suspension, wherein the precipitation is carried out in the following manner:
  (i.2) an initial base stock comprising a silicate of alkali metal M is formed, the silicate concentration (expressed as $SiO_2$) in the said initial base stock being lower than 20 g/l,
  (ii.2) acidifying agent is added to the said base stock until at last 5% of the quantity of $M_2O$ present in the said base stock is neutralized,
  (iii.2) acidifying agent and a silicate of alkali metal M are added simultaneously to the reaction mixture such that the ratio of the quantity of silicate added (expressed as $SiO_2$)/the quantity of silicate present in the initial base stock (expressed as $SiO_2$) is greater than 4 and at most 100, the said process including one of the following two operations (a2) or (b2):
  (a2) at least one aluminium compound A and then a basic agent, are added to the reaction mixture after stage (iii.2), the said separation comprising a filtration and disintegration of the cake originating from this filtration, the said disintegration being performed in the presence of at least one aluminium compound B,
  (b2) a silicate and at least one aluminium compound A are added simultaneously to the reaction mixture after stage (iii.2) and, when the said separation comprises a filtration and disintegration of the cake originating from this filtration, the disintegration is preferably performed in the presence of at least one aluminium compound B.

The precipitated silica S2 present in composition (C2) is generally effectively prepared by the above described process. Especially in that case, this specific silica S2 has a remarkable dispersibility in the elastomer E, which is due to the specific implementation of the process as disclosed above, which implements a particular introduction of aluminium, combined with a low concentration of silicate and electrolyte and at an appropriate degree of consolidation during the simultaneous addition stage.

Similarly to process of fabrication of S1, the process for the synthesis of precipitated silica S2 is a process of preparation of precipitated silica, wherein an acidifying agent is reacted with a silicate in specific conditions, but the choice of the acidifying agent and of the silicate may be made in a manner which is well known per se.

Thus, acidifying agent and silicate used for the synthesis of S2 may be as defined above for the process of preparing of S1. Preferably, sulphuric acid is employed as the acidifying agent, and sodium silicate as the silicate. In the cases where the acidifying agent is sulphuric acid, its concentration may be between 40 and 180 g/l, for example between 60 and 130 g/l. When sodium silicate is employed as silicate, the latter generally exhibits an $SiO_2/Na_2O$ weight ratio of between 2 and 4, for example between 3.0 and 3.7.

The process of preparation of silica S2 is operated in a specific manner, according to the following stages.

First of all, a base stock is formed which includes a silicate a silicate of alkali metal M (stage (i.2)). The quantity of silicate present in the initial base stock advantageously represents only a part of the total quantity of silicate introduced into the reaction.

In stage (i.2), the silicate concentration in the initial base stock is higher than 0 g/l and lower than 20 g of $SiO_2$ per liter. This concentration may be of at most 11 g/l and, optionally, of at most 8 g/l.

Especially when the separation performed subsequently during the process of preparation of S2 includes a filtration performed by means of a filter press (and more particularly in the case where it is desired that silica S2 has a CTAB specific surface of at least 140 $m^2/g$), this concentration may be at least 8 g/l, in particular between 10 and 15 g/l, for example between 11 and 15 g/l; the drying used later in the process according to the invention may be performed by spraying by means of a multinozzle sprayer.

The base stock may include an electrolyte. Nevertheless, preferably, no electrolyte is employed in the course of the process of preparation according to the invention. In particular, the initial base stock preferably does not include any electrolyte.

The stage (ii.2) of the process of preparation of silica S2 consists in adding the acidifying agent to the base stock of stage (i.2). In stage (ii.2), the acidifying agent is added to the said initial base stock until at least 5%, preferably at least 50%, of the $M_2O$ quantity present in the said initial base stock is neutralized. The acidifying agent is preferably added to the said initial base stock until 50 to 99% of the quantity of $M_2O$ present in the said initial base stock is neutralized.

Once the desired value of neutralized $M_2O$ quantity is reached, a simultaneous addition (stage (iii.2)) is then undertaken, of acidifying agent and of a quantity of silicate of alkali metal M such that the degree of consolidation, that is to say the ratio of the quantity of silicate added (expressed as $SiO_2$)/the quantity of silicate present in the initial base stock (expressed as $SiO_2$) is higher than 4 and at most of 100.

According to a specific embodiment of the process or preparation of S2, the simultaneous addition of stage (iii.2) is conducted such that the degree of consolidation is more particularly between 12 and 100, preferably between 12 and 50, especially between 13 and 40.

According to another embodiment of the process, the simultaneous addition is conducted such that the degree of consolidation is rather higher than 4 and lower than 12, preferably between 5 and 11.5, especially between 7.5 and 11. This second embodiment is generally used when the silicate concentration in the initial base stock is at least 8 g/l, in particular between 10 and 15 g/l, for example between 11 and 15 g/l.

Throughout the stage (iii.2) the quantity of acidifying agent which is added is preferably such that 80 to 99%, for example 85 to 97%, of the quantity of $M_2O$ which is added is neutralized.

In stage (iii.2) it is possible to undertake the simultaneous addition of acidifying agent and of silicate at a first pH plateau of the reaction mixture, pH1, and then at a second pH plateau of the reaction mixture, pH2, such that 7<pH2<pH1<9.

As stressed, the process of preparation of silica S2 further includes one of the two operations, (a2) or (b2) defined above.

Thus, according to a first embodiment, the process of preparation of silica S2 useful in composition (C2) includes the operation (a2). In that case, the following successive stages (iv.2), (v.2) and (vi.2) are advantageously performed, preferably after having carried out the precipitation according to the stages (i.2), (ii.2) and (iii.2):

(iv.2) at least one aluminium compound A is added to the reaction mixture (that is to say to the reaction suspension or slurry obtained), (v.2) a basic agent is added to the reaction mixture preferably until a pH value of the reaction mixture of between 6.5 and 10, in particular between 7.2 and 8.6, is obtained, (vi.2) acidifying agent is added to the reaction mixture, preferably until a pH value of the reaction mixture of between 3 and 5, in particular between 3.4 and 4.5, is obtained.

After the simultaneous addition of stage (iii.2) it may then be advantageous to perform a maturing of the reaction mixture, it being possible for this maturing to last, for example, from 1 to 60 minutes, in particular from 3 to 30 minutes.

When stage (iv.2) is implemented, it is desirable, between stage (iii.2) and stage (iv.2), and especially before the said optional maturing, to add an additional quantity of acidifying agent to the reaction mixture. This addition is generally done until a pH value of the reaction mixture of between 3 and 6.5 (in particular between 4 and 6) is obtained. The acidifying agent employed during this addition is generally identical with that employed during stages (ii.2), (iii.2) and (vi.2).

A maturing of the reaction mixture is usually performed between stage (v.2) and (vi.2), for example for 2 to 60 minutes, in particular for 5 to 45 minutes.

Similarly, a maturing of the reaction mixture is in most cases performed after stage (vi.2), for example for 2 to 60 minutes, in particular for 5 to 30 minutes.

The basic agent employed during stage (iv.2) may be a solution of aqueous ammonia or, preferably, a solution of sodium hydroxide (or soda).

According to another embodiment, the process of preparation of silica S2 includes the operation (b2). In that case, a stage (vii.2) is performed after the stages (i.2), (ii.2) and (iii.2). said stage (vii.2) consists in adding a silicate and at least one aluminium compound A simultaneously to the reaction mixture.

After the simultaneous addition of stage (vii.2) it may then be advantageous to perform a maturing of the reaction mixture, for example, from 2 to 60 minutes, in particular from 5 to 30 minutes.

When implementing stage (vii.2), it is desirable, after said stage (vii.2), and especially after this optional maturing, to add an additional quantity of acidifying agent to the reaction mixture. This addition is generally done until a pH value of the reaction mixture of between 3 and 6.5, in particular between 4 and 6, is obtained.

The acidifying agent employed during this addition is generally identical with that employed during stages (ii) and (iii) of the second alternative form of the process of preparation according to the invention.

A maturing of the reaction mixture is usually performed after this addition of acidifying agent, for example for 1 to 60 minutes, in particular for 3 to 30 minutes.

The aluminium compounds A employed in the process of preparation of S2 is generally an organic or inorganic aluminium salt. By way of examples of an organic salt there may be mentioned especially the salts of carboxylic or polycarboxylic acids, like the salts of acetic, citric, tartaric or oxalic acid. By way of examples of an inorganic salt there may be mentioned especially halides and oxyhalides (like chlorides and oxychlorides), nitrates, phosphates, sulphates and oxysulphates.

In practice, the aluminium compound A may be employed in the form of a solution, generally aqueous.

An aluminium sulphate is preferably employed as aluminium compound A.

In the preparation of S2, The temperature of the reaction mixture is generally between 60 and 98° C. According to an alternative form of the invention the reaction is performed at a constant temperature of between 70 and 96° C. According to another alternative form of the invention the temperature at the end of the reaction is higher than the temperature at the beginning of reaction; the temperature at the beginning of the reaction is thus maintained preferably between 70 and 96° C. and the temperature is then raised over a few minutes, preferably up to a value of between 75 and 98° C., which value it is maintained until the end of the reaction; the operations (a2) or (b2) are thus usually performed at this constant temperature value.

In the process of preparation of S1, the suspension obtained at the outcome of the precipitation reaction (silica slurry) is submitted to a liquid-solid separation.

When the process of the preparation of S2 includes the operation (a2), this separation comprises a filtration (followed by washing if necessary) and a disintegration, the said disintegration being performed in the presence of at least one aluminium compound B and, preferably, in the presence of an acidifying agent as described above (in this latter case the aluminium compound B and the acidifying agent are advantageously added simultaneously).

The disintegration operation, which may be carried out, for example, by passing the filter cake through a mill of the colloid or bead type, makes it possible in particular to lower the viscosity of the suspension to be subsequently dried.

When the process of the preparation of S2 includes the operation (b2), the separation also comprises, in general, a filtration (followed by washing if necessary) and a disintegration, the said disintegration being preferably performed in the presence of at least one aluminium compound B and, in general, in the presence of an acidifying agent as described above (in this latter case the aluminium compound B and the acidifying agent are advantageously added simultaneously).

The aluminium compound B is usually different from the aluminium compound A. Thus, compound B is generally selected from alkali metal aluminate, especially potassium aluminate, or, very preferably, sodium aluminate, The precipitated silica S2 present in compositions (C2) preferably contains at least 0.45%, and preferably of at least 0.50%, for example between 0.50 and 1.50%, or even between 0.75 and 1.40%, by weight of aluminium. Therefore, the quantities of the aluminium compounds A and B to be used in the process of preparation of S1 are preferably chosen so as to reach an aluminium content in these ranges.

The separation used in the process of preparation of S2 usually includes a filtration performed by means of any suitable method, for example by means of a belt filter, a rotary vacuum filter or, preferably, a filter press.

The suspension of precipitated silica thus recovered (filter cake) is then dried. This drying may be done according to any method that is known per se.

The drying is preferably done by spraying. Any suitable type of sprayer may be employed for this purpose, especially a turbine, nozzle, liquid-pressure or two-fluid sprayer. The drying is, for example, performed by spraying by means of a multinozzle sprayer especially when the silicate concentration in the initial base stock is at least 8 g/l (and lower than 20 g/l), in particular of between 10 and 15 g/l (and more particularly in the case where it is desired to prepare a silica S2 which have a CTAB specific surface of at least 140 m$^2$/g).

According to one embodiment of the invention, the suspension to be dried has a solids content higher than 15% by weight, preferably higher than 17% by weight and, for example, higher than 20% by weight. The drying is then preferably performed by means of a multinozzle sprayer. The precipitated silica S2 obtainable according to this embodiment, and preferably by using a filter press, is advantageously in the form of substantially spherical beads, preferably of a mean size of at least 80 μm. Such specific precipitated silica is particularly advantageous in the composition (C2) of the invention.

In the general case, it should be noted that dry material for example silica in pulverulent form may be also added to the filter cake after the filtration, at a subsequent stage of precipitated silica S2

At the end of the drying, a stage of milling may be undertaken on the product recovered, especially on the product obtained by drying a suspension which has a solids content higher than 15% by weight. The precipitated silica which is then obtainable is generally in the form of a powder, preferably with a mean size of at least 15 μm, in particular between 15 and 60 μm, for example between 20 and 45 μm.

Similarly, according to another embodiment of the invention, the suspension to be dried has a solids content of at most 15% by weight. The drying is then generally performed by means of a turbine sprayer. The precipitated silica S2 obtainable according to this embodiment, and preferably by using a rotary vacuum filter, is generally in the form of a powder, preferably with a mean size of at least 15 μm, in particular between 30 and 150 μm, for example between 45 and 120 μm.

According to a third aspect, another subject of the instant invention is an elastomeric composition (C3) containing the at least one butadienic elastomer E as defined above, which contains a precipitated silica S3 as at least one reinforcing filler, wherein said precipitated silica S3 has;
- a CTAB specific surface of between 140 and 200 m$^2$/g, and preferably between 145 and 180 m$^2$/g;
- a BET specific surface of between 140 and 200 m$^2$/g, preferably between 150 and 190 m$^2$/g;
- a DOP oil uptake lower than 300 ml/100 g, preferably between 200 and 295 ml/100 g;
- a median diameter ($\varnothing_{50}$), after disintegration with ultrasound, smaller than 3 μm, preferably smaller than 2.8 μm, for example smaller than 2.5 μm;
- an ultrasonic disintegration factor ($F_D$) higher than 10 ml, preferably higher than 11 ml, advantageously of at least 15 ml; and for example, of at least 21 ml;

an aluminium content of at least 0.45% by weight, this content being preferably of between 0.50 and 1.50% by weight; advantageously between 0.75 and 1.40% by weight.

In the sense of the instant description the "CTAB specific surface" designates the outer surface of the silica as determined according to NF standard T 45007 (November 1987) (5.12);

the "BET specific surface" refers to the specific surface as determined according to the Brunauer-Emmet-Teller method described in the Journal of the American Chemical Society, Vol. 60, page 309, February 1938 and corresponding to NF standard T 45007 (November 1987);

The "DOP oil uptake" is determined according to NF standard T 30-022 (March 1953) by using dioctyl phthalate.

the "median diameter ($\varnothing_{50}$) after disintegration with ultrasound" and the "ultrasonic disintegration factor ($F_D$)" refer to a specific disintegration test for assessing dispersibility and disintegratability properties of the silica, which is carried out according to the following procedure.

The cohesion of the agglomerates is assessed by a particle size measurement (using laser scattering), performed on a silica suspension previously disintegrated by ultrasonic treatment; the disintegratability of the silica is thus measured (rupture of objects from 0.1 to a few tens of microns). The disintegration under ultrasound is performed with the aid of a Vibracell Bioblock (600 W) sonic transducer equipped with a probe 19 mm in diameter. The particle size measurement is performed by laser scattering on a Sympatec particle size analyzer.

2 grams of silica are measured out into a specimen tube (height: 6 cm and diameter: 4 cm) and are made up to 50 grams by adding demineralized water; an aqueous suspension containing 4% of silica is thus produced, which is homogenized for 2 minutes by magnetic stirring. The disintegration under ultrasound is next performed as follows: with the probe immersed to a depth of 4 cm, the power is adjusted so as to obtain a needle deflection on the power dial indicating 20%. The disintegration is performed for 420 seconds. The particle size measurement is then carried out after a known volume (expressed in ml) of the homogenized suspension has been introduced into the cell of the particle size analyzer.

The value of the median diameter $\varnothing_{50}$ which is obtained is proportionally smaller the higher the disintegratability of the silica. The ratio (10× volume of dispersion introduced (in ml))/optical density of the suspension detected by the particle size analyzer (this optical density is of the order of 20) is also determined. This ratio is an indication of the proportion of fines, that is to say of the content of particles smaller than 0.1 µm, which are not detected by the particle size analyzer. This ratio, called the "ultrasonic disintegration factor ($F_D$)" is proportionally higher the higher the disintegratability of the silica.

Examples of silica S3 useful as reinforcing filler in composition (C3) are especially described in U.S. Pat. No. 5,800,608.

Preferably, the silica S3 present in a composition (C3) has a pore distribution such that the pore volume consisting of the pores whose diameter is between 175 and 275 Å represents at least 50%, for example at least 60%, of the pore volume consisting of the pores of diameters smaller than or equal to 400 Å.

The given pore volumes are measured by mercury porosimetry, the pore diameters being calculated from the Washburn relationship with an angle of contact theta equal to 130° and a surface tension gamma equal to 484 dynes/cm (Micromeritics 9300 porosimeter).

According to a very preferred embodiment, the silica S3 present in composition (C3) has a BET specific surface/CTAB specific surface ratio of between 1.0 and 1.2, that is to say that silica S3 preferably has a very low microporosity.

Besides, the pH of silica S3 present in composition (C3) is generally between 6.5 and 7.5, for example between 6.7 and 7.3. This pH is the pH as measured according to ISO standard 787/9 (pH of a suspension at a concentration of 5% in water).

The silicas S3 may be introduced in composition (C3) in the form of powders, of substantially spherical beads or, optionally, of granules, or in the form of mixture of these forms. Silica C3 have an excellent dispersibility and disintegratability in the elastomer E.

A silica S3 in the form of a powder preferably has preferably a mean size of at least 15 µm; the latter is, for example, between 15 and 60 µm (especially between 20 and 45 µm) or between 30 and 150 µm (especially between 45 and 120 µm).

Besides, a silica S3 in the form of a powder preferably has one or more of the following features (and preferably all of them):

a DOP oil uptake of between 240 and 290 ml/100 g.
a total pore volume of at least 2.5 cm$^3$/g and, more particularly, of between 3 and 5 cm$^3$/g; and/or
a packing density (PD) of the said powders is generally at least 0.17 and, for example, between 0.2 and 0.3.

In the sense of the present description, the "packing density" (PD) designate the density measured according to NF T standard 30-042.

A silica S3 may advantageously be introduced in composition (C3) in the form of substantially spherical beads (pearls) having a mean size of at least 80 µm. According to certain alternative forms of the invention, this mean bead size is at least 100 µm, for example at least 150 µm; it is generally at most 300 µm and preferably lies between 100 and 270 µm. This mean size is determined according to NF standard X 11507 (December 1970) by dry screening and determination of the diameter corresponding to a cumulative oversize of 50%.

A silica S3 in the form of substantially spherical beads (pearls) preferably have a DOP oil uptake of between 240 and 290 ml/100 g.

The packing density (PD) of the said beads (or pearls) is generally at least 0.17 and, for example, between 0.2 and 0.34.

Said beads usually have a total pore volume of at least 2.5 cm$^3$/g and, more particularly, of between 3 and 5 cm$^3$/g.

Alternatively, silica S3 may be introduced in the form of granules, the dimensions of which are preferably of at least 1 mm, in particular between 1 and 10 mm, along the axis of their largest dimension (length).

Such granules preferably have a DOP oil uptake of between 200 and 260 ml/100 g.

The said granules may be of the most diverse shape. The shapes which may be especially mentioned by way of example are the spherical, cylindrical, parallelepipedal, tablet, flake, pellet and extrudate of circular or polylobar section.

The packing density (PD) of the said granules is generally at least 0.27 and may range up to 0.37. They generally have a total pore volume of at least 1 cm$^3$/g and, more particularly, between 1.5 and 2 cm$^3$/g.

According to a fourth aspect, another subject of the instant invention is an elastomeric composition (C4) containing the at least one butadienic elastomer E as defined above, which contains a precipitated silica S4 as at least one reinforcing filler, wherein said precipitated silica S4 has
 a CTAB specific surface of between 100 and 240 m$^2$/g,
 a DOP oil uptake lower than 300 ml/100 g, preferably between 200 and 295 ml/100 g,
 a pore distribution such that the pore volume consisting of the pores whose diameter is between 175 and 275 Å represents less than 50% of the pore volume consisting of the pores of diameters which are smaller than or equal to 400 Å (the given pore volumes are measured by mercury porosimetry, the pore diameters being calculated from the Washburn relationship with an angle of contact theta equal to 130° and a surface tension gamma equal to 484 dynes/cm (Micromeritics 9300 porosimeter)).

a median diameter ($\emptyset_{50}$), after disintegration with ultrasound, smaller than 5 µm, an aluminium content of at least 0.45% by weight, preferably of between 0.50 and 1.50% by weight; and especially between 0.75 and 1.40% by weight.

Preferably, the silica S4 present in a composition (C4) has a pore distribution such that the pore volume consisting of the pores whose diameter is between 175 and 275 Å represents less than 40% of the pore volume consisting of the pores of diameters smaller than or equal to 400 Å.

Examples of silica S4 useful as reinforcing filler in composition (C4) are especially described in U.S. Pat. No. 5,876,494.

According to a particular embodiment of the invention the precipitated silica S4 present in composition (C4) has:

a CTAB specific surface of between 140 and 240 m$^2$/g, preferably between 140 and 225 m$^2$/g, in particular between 150 and 225 m$^2$/g, for example between 150 and 200 m$^2$/g, an ultrasonic disintegration factor ($F_D$) higher than 5.5 ml, in particular higher than 11 ml, for example higher than 12.5 ml.

preferably a BET specific surface of between 140 and 300 m$^2$/g, in particular between 140 and 280 m$^2$/g, for example between 150 and 270 m$^2$/g.

According to another particular embodiment of the invention the precipitated silica S4 has:

a CTAB specific surface of between 100 and 140 m$^2$/g, preferably between 100 and 135 m$^2$/g, a median diameter ($\emptyset_{50}$), after disintegration with ultrasound, smaller than 4.5 µm, in particular smaller than 4 µm, for example smaller than 3.8 µm.

preferably BET specific surface of between 100 and 210 m$^2$/g, especially between 100 and 180 m$^2$/g.

More generally, the silica S4 has a BET specific surface/CTAB specific surface ratio of between 1.0 and 1.2. in other words, silica S4 has preferably a very low microporosity.

According to another alternative form of the invention the silica S4 of the composition (C4) has a BET specific surface/CTAB specific surface ratio higher than 1.2, for example between 1.21 and 1.4, that is to say that it exhibits a relatively high microporosity.

The pH of the silica S4 is generally between 6.5 and 7.5, for example between 6.7 and 7.3.

The silica S4 may be introduced in composition (C4) in different forms, i.e. at least one of powders, substantially spherical beads or granules. They have a very good dispersibility and disintegratability in the elastomer E.

The silica S4 introduced in the form of powders preferably has a mean size of at least 15 µm; the latter is, for example, between 15 and 60 µm (especially between 20 and 45 µm) or between 30 and 150 µm (especially between 45 and 120 µm).

They have, preferably, a DOP oil uptake of between 240 and 290 ml/100 g.

The packing density (PD) of the said powders is generally at least 0.17 and, for example, between 0.2 and 0.3.

The said powders generally have a total pore volume of at least 2.5 cm$^3$/g and, more particularly, of between 3 and 5 cm$^3$/g.

Preferably, silica S4 is introduced in composition (C4) in the form of substantially spherical beads, preferably having a mean size of at least 80 µm. According to specific embodiments, this mean bead size is at least 100 µm, for example at least 150 µm; it is generally at most 300 µm and preferably lies between 100 and 270 µm. This mean size is determined according to NF standard X 11507 (December 1970) by dry screening and determination of the diameter corresponding to a cumulative oversize of 50%.

A silica S4 introduced in the form of beads (or prills) have a DOP oil uptake of between 240 and 290 ml/100 g.

The packing density (PD) of the said beads is generally at least 0.17 and, for example, between 0.2 and 0.34.

Said beads usually have a total pore volume of at least 2.5 cm$^3$/g and, more particularly, of between 3 and 5 cm$^3$/g.

Alternatively, silica S4 may also be introduced in composition (C4) in the form of the granules, the dimensions of which are of at least 1 mm, in particular between 1 and 10 mm, along the axis of their largest dimension (length).

These granules preferably have a DOP oil uptake of between 200 and 260 ml/100 g.

The said granules may be of the most diverse shape. The shapes which may be especially mentioned by way of example are the spherical, cylindrical, parallelepiped, tablet, flake, pellet and extrudate of circular or polylobar section.

The packing density (PD) of the said granules is generally at least 0.27 and may range up to 0.37. They generally have a total pore volume of at least 1 cm$^3$/g and, more particularly, between 1.5 and 2 cm$^3$/g.

The butadienic elastomer E which is present in the above defined composition (C1), (C2), (C3) and (C4) comprises a functionalized butadienic elastomer prepared in solution, preferably in a polymerization solvent selected from n-hexane, cyclohexane, heptane, and benzene. Said butadienic elastomer E being functionalized by at least one polyfunctional coupling agent having an alkoxy silane group.

Preferably, said functionalized butadienic elastomer comprised in the butadienic elastomer E used in the compositions of the invention is a functionalized butadiene-styrene copolymer prepared in solution (SSBR). Advantageously, this functionalized butadiene-styrene copolymer prepared in solution has:

(a) a styrene content from 5 to 45 wt %, and preferably from 15 to 45 wt %;

(b) 20 to 80% of a microstructure 1,2-bond of butadiene portion, and preferably from 25 to 70%, and more preferably from 30 to 70%;

(c) a glass transition temperature from –55° C. to –20° C., preferably from –55° C. to –30° C., and more preferably from –45° C. to –30° C. This glass transition temperature can be adjusted by controlling the styrene content in the polymerization (e.g. by controlling the feed rate of styrene during the polymerization and the microstructure 1,2-bond (vinyl) of butadiene portion).

Advantageously, the functionalized butadiene-styrene copolymer (SSBR) as defined above further has:

(d) 40 wt % or more of a single styrene bond and 10 wt % or less of long styrene chain which contains 8 or more styrene molecules, among the total styrene bonds. A more preferable proportion of the single styrene bond is from 40 to 80% by weight and a more preferable proportion of the long styrene chains is 5% by weight, or less. The proportion of the single styrene bond and long chains in the styrene unit can be adjusted by (1) a method of controlling the polymerization temperature, or (2) a method of continuously introducing butadiene. Specifically, the rate of polymerization not only differs for styrene and butadiene, but also is affected by the polymerization temperature and the monomer concentrations. Because of these reasons, when styrene and butadiene are simply reacted, styrene is more reactive during the latter half of polymerization when the temperature is high, due to the effect of temperature and a larger concentration of styrene monomer in the reaction mixture. This results in the formation of a large amount of long chain styrene and thus a higher proportion of long chains. To appropriately adjust the proportion of the single styrene bond and long chain styrene, the formation of a large amount of long chains can be decreased by the above methods (1) or (2). In the method (1), the polymerization temperature is controlled so that the reaction rate of the styrene and that of the butadiene are maintained equivalent. In the method (2), the reaction is initiated with a reduced initial amount of butadiene and then a balance of butadiene is continuously fed to appropriately control the length of the produced styrene chains (i.e. appropriately control the proportion of the single bond and long chain).

In the general case, the elastomer E present in the elastomeric compositions of the invention is prepared in solution, preferably by polymerization of butadiene, or, preferably, by copolymerization of butadiene with at least another comonomer, in particular styrene, generally in presence of an initiator. The content of each monomer in the obtain polymer may be varied by adjusting the initial ratio between the use monomers.

When it is desired that elastomer E in majority comprise a functionalized butadiene-styrene copolymer (SSBR) as defined above, elastomer E is preferably obtained by copolymerization of butadiene and styrene in presence of lithium-type initiators, which are preferred, especially in view of their low cost, and stability in the polymerization reaction.

As examples of lithium-type initiators useful for copolymerization of butadiene and styrene, one may recite organic lithium compounds, and especially alkyl lithium (such as n-butyl lithium, sec-butyl lithium, and t-butyl lithium); alkylene dilithium (such as 1,4-dilithium butane); aromatic hydrocarbon lithium (such as phenyl lithium, stilbene lithium, diisopropenyl benzene lithium), reaction products of an alkyl lithium (such as butyl lithium) and divinylbenzene or the like; polynuclear hydrocarbon lithium, such as lithium naphtalene; amino lithium; or tributyltin lithium.

In addition to the polymerization initiator, ether compound, tertiary amine, or the like, can be used as a styrene randomization agent or as a microstructure modifier of the butadiene unit in the polymer during the copolymerization of butadiene and styrene, if required. As examples of compounds acting as randomization agent, one may recite dimethoxybenzene, tetrahydrofuran, dimethoxyethane, diethylene glycol dibutyl ether, diethylene glycol dimethyl ether, triethylamine, pyridine, N-methyl-morpholine, N,N,N',N'-tetramethylethylenediamine, or dipiperidinothane. By using such compounds, the content of the microstructure 1,2-bond can be adjusted.

In general case, the elastomer E may be obtained by a polymerization in solution which can be carried out either by a batch system or continuous system, at a temperature suitably selected from the range usually from 0° C. to 130° C., and preferably from 10° C. to 100° C. Usually, the reaction time for the polymerization is suitably selected from the range from 5 minutes to 24 hours, and preferably from 10 minutes to 10 hours.

During the polymerization, especially when using a lithium initiator, it is desirable to avoid contamination of the polymerization system with a compound which may deactivate the initiator, such as a halogen compound, oxygen, water, or carbon dioxide.

In general, an elastomer E for an use in a composition of the instant invention is preferably extended using extender oil, said extender oil being introduced in an amount from 20 to 50 parts by weight, and more preferably from 30 and 40 parts by weight, for 100 parts by weight of the total elastomer components; especially when elastomer E is in majority a functionalized butadiene-styrene copolymer prepared in solution (SSBR). Thus, as elastomer E in the compositions (C1), (C2), (C3) and (C4) of the invention, butadienic elastomers described EP 916 699 may e.g. be used.

Useful extender oils which may be implemented in the composition of the invention especially comprise Naphthene-type, paraffin-type, and aromatic oil-type extender oils. Aromatic-type extender oils are preferred. Extender oil for an use in the compositions of the invention have advantageously a viscosity-specific gravity constant of ASTM 02501 in the range preferably from 0.900 to 1.100, and more preferably from 0.920 to 0.990.

There are no specific limitations to the method of extension using oil. One example of such a method comprises adding an extender oil to the styrene-butadiene copolymer after the polymerization, removing the solvent, and drying of the product by a conventional method Especially when it is in majority based on a (SSBR) elastomer, the butadienic elastomer E has advantageously a molecular weight distribution (weight average molecular weight/number average molecular weight) from 1.5 to 3.0, and preferably from 1.5 to 2.5, and even more preferably from 1.5 to 2.1. In these ranges, one obtain in particular a good processability of the composition of the invention, especially a low viscosity.

The butadienic elastomer E present in the compositions of the invention is a elastomer functionalized by alkoxy silane and/or alkoxy silane sulfide coupling agents, which usually has a branched structure. The functionalization by the coupling agent usually is a terminal modification of the elastomer by said polyfunctional coupling agents. To this end, a specific method comprises reacting reactive polymers having a lithium reactive terminal which are obtained after polymerization with the coupling agents (alkoxysilane compounds and/or alkoxysilane sulfide compounds).

In the elastomeric compositions (C1), (C2), (C3) and (C4) of the instant invention, the weight ratio of the silica filler to the butadienic elastomer E is generally from 30 to 100 parts of silica filler by weight for 100 parts by weight of the elastomer E. This ratio is advantageously of more than 50 parts, and more preferably of more than 70 parts, of silica filler by weight for 100 parts by weight of elastomer. Besides, this ratio is generally of less than 90 parts of silica filler by weight for 100 parts by weight of elastomer. Typically, this ratio is about 80 parts (e.g. between of silica filler by weight for 100 parts by weight of elastomer.

The compositions of the invention may be in a crude state or in a vulcanized state.

In most cases, especially so as to limit the viscosity and allow the processability of the composition in the crude state, a composition according to the instant invention generally comprises at least one coupling agent. The coupling agent useful in this scope is known per se and may be selected from any coupling agent known in the state of the art. Especially, the coupling agents may be selected from organosilanes, or polyfunctional polyorganosiloxanes, especially among silanes polysulfide, e.g. (di-, tri- or tetra-sulfide) of bis-(alcoxy(C1-C4)-alkyl(C1-C4)silyl-alkyl(C1-C4). Coupling agents of particular interest of interest are especially bis(3-triéthoxysilylpropyl) or bis(3-triméthoxysilylpropyl) polysulfides, such as the bis(3-triéthoxysilylpropyl)disulfide (TESPD), or the bis(3-triéthoxysilylpropyl)tetrasulfide (TESPT).

As already stressed in the specific compositions of the invention, the amount of coupling agent to be used to reduce viscosity is surprisingly low, in comparison with usual compositions.

Thus, in the general case, a composition according to the instant invention generally exhibit good viscosity properties, which especially allow an easy processability of the composition in the crude state, even if the ratio (coupling agent/silica) is equal to or of less than 4% by weight, and, in most cases, even if this ratio is of less than 3% by weight.

The composition of the invention may comprise higher amount of coupling agents, which leads to a further decrease of the viscosity. Nevertheless, it is in most cases of particularly interest that the amount of coupling agent in the composition is as low as possible, especially since, with low content of coupling agents, the effect of decrease of the rolling resistance of the composition of the invention is particularly marked. Therefore, in the compositions of the invention, the ratio (coupling agent/silica) is generally of 8% or less, and this ratio is preferably of at most 4% by weight, or even of at most 3% by weight in some cases.

As stressed, the compositions (C1), (C2), (C3), and (C4) further exhibit excellent low rolling resistance, together with good grip properties and very good wear resistance.

Given the above properties, the compositions of the invention are particularly suitable for manufacturing tires or articles destined for tires, especially tire tread. This specific use constitute a specific subject of the present invention.

The rubber article for tire, based on at least one elastomeric composition of the invention (especially tire tread), and the tires comprising such articles, especially a tire tread based on a composition (C1), (C2), (C3) or (C4), also constitute a specific subject of the invention.

EXAMPLE

Different Rubber compositions according to the invention were prepared from the following functionalized elastomer and filler doped with aluminium:
Functionalized Elastomer: Styrene-Butadiene copolymer with terminal alkoxysilane groups, and extended with an extender oil (oil with a viscosity-specific gravity constant (ASTM 02501) of 0.963, commercially available at FUJIKO-SAN Co. Ltd. Under the tradename "Fukkol Aromax #3"), commercially available at JSR Corporation under the commercial name of T596, having the following composition:
  Butadiene: 68%
  Styrene: 26%
  Extender Oil: 37.5 part for 100 part of rubber
Filler doped with aluminium: Silica Z1165 MPS commercialized by Rhodia (highly dispersible silica doped with aluminium)
For comparative assays, the same compositions were prepared, wherein elastomer and/or filler where replaced by the following non-functionalized elastomer and non-doped silica:
Non-functionalized Elastomer: non-functionalized Styrene-Butadiene copolymer 5525-1 extended with an aromatic oil, commercialized by Bayer, having the following composition:
  Butadiene: 70%
  Styrene: 26%
  Oil: 37.5 part for 100 part of rubber.

Non-doped filler: Silica Z1165 MP commercialized by Rhodia (highly dispersible silica)

3 kinds of compositions as described in table I were prepared, with a coupling agent (TESPT) at different content. TESPT contains sulfurs which may modify the properties of the compositions. Therefore, when varying the content of TESPT, a sulfur adjustment has been made by adding sulfur S8, so as to compare the compositions at the same sulfur content.

For each kind of composition, it was prepared:
(1) a composition according to the invention, comprising functionalized elastomer T596 and Al-doped filler Z1165 MPS,
(2) three test compositions comprising respectively:
  functionalized elastomer T596 and non-doped filler Z1165 MP;
  elastomer 5525-1 and Al-doped filler Z1165 MPS; and
  elastomer 5525-1 and non-doped filler Z1165 MP.
In other words, 3 compositions according to the invention and 9 test compositions have been prepared.

TABLE I

| Formulations (indications are in parts by weight for 100 parts of rubber (phr)) | | | |
|---|---|---|---|
| Elastomer (T596 or 5525-1) | 100 | 100 | 100 |
| Butadiene rubber BR (KBR01) | 25 | 25 | 25 |
| TESPT | 6.4 | 4.8 | 3.2 |
| 6PPD | 1.9 | 1.9 | 1.9 |
| ZnO | 2.5 | 2.5 | 2.5 |
| Stearic acid | 2 | 2 | 2 |
| CBS | 1.7 | 1.7 | 1.7 |
| DPG | 2 | 2 | 2 |
| S | 1.4 | 1.7 | 2.0 |
| Filler (Z1165 MPS or Z1165 MP) | 80 | 80 | 80 |

Mixing Procedure
The compounds have been realized in a laboratory Banbury mixer with the conditions of table II
For the Z1165 MPS, the stearic acid introduction has been postponed at the end of the first step to avoid the interactions able to act at the silica surface between the silane and the stearic acid. The Z1165 MP has been proceeded with a standard mixing procedure

TABLE II

| mixing procedure | | |
|---|---|---|
| Steps and Time (minutes) | Temperatures (° C.) | Introduction and dump |
| First step | | |
| 0 | 70 | Elastomers |
| 2 | | ⅔ silica + silane |
| 4 | | ⅓ silica + stearic acid (with Z1165 MP) |
| 6 | | Stearic acid (with Z1165 MRS) |
| 7 | 150 | Dump |
| Second step | | |
| 0 | 70 | Masterbatch |
| 1 | | ZnO + 6PPD |
| 4 | 150 | Dump |

Compositions Properties
The 12 compositions have been tested in the manufacturing of a classical passenger car tire tread recipe in order to compare the different systems.
The results are reported in table III.

TABLE III properties of the compositions

| Elastomer and silica filler | Amount of TESPT (phr) | Mooney viscosity ML(1 + 4) 100° C. | Abrasion Loss. (mm$^3$)(*) | tg δ at 70° C. | tg δ at 0° C. |
|---|---|---|---|---|---|
| 5525-1 + Z1165MP | 6.4 | 77 | 122/140 | 0.146 | 0.695 |
| 5525-1 + Z1165MP | 4.8 | 81 | 125/142 | 0.142 | 0.680 |
| 5525-1 + Z1165MP | 3.2 | 103 | 128/145 | 0.142 | 0.630 |
| T596 + Z1165MP | 6.4 | 91 | 117125 | 0.127 | 0.675 |
| T596 + Z1165MP | 4.8 | 96 | 117/138 | 0.120 | 0.630 |
| T596 + Z1165MP | 3.2 | 117 | 123/146 | 0.124 | 0.638 |
| 5525-1 + Z1165MPS | | 75 | 115/129 | 0.129 | 0.666 |
| 5525-1 + Z1165MPS | 4.8 | 75 | 121/136 | 0.127 | 0.660 |
| 5525-1 + Z1165MPS | 3.2 | 85 | 125/140 | 0.125 | 0.650 |
| T596 + Z1165MPS | 6.4 | 84 | 107/120 | 0.121 | 0.643 |
| T596 + Z1165MPS | 4.8 | 86 | 116/126 | 0.109 | 0.572 |
| T596 + Z1165MPS | 3.2 | 93 | 119/133 | 0.090 | 0.585 |

(*)Abrasion properties are given as initial/after aging

The invention claimed is:

1. An elastomeric composition (C1) containing at least one butadienic elastomer E, which contains precipitated silica S1 as at least one reinforcing filler and at least one coupling agent, wherein:
   the butadienic elastomer E comprises a functionalized butadienic elastomer prepared in solution, which is modified by at least one polyfunctional coupling agent having an alkoxy silane group; and
   said precipitated silica S1 is prepared by a process including a precipitation reaction of a silicate with an acidifying agent, whereby a suspension of precipitated silica is obtained, and then the separation and the drying of this suspension, wherein:
   the precipitation reaction is carried out in the following manner:
   (i.1) an initial base stock comprising a silicate and an electrolyte is formed, the silicate concentration (expressed as SiO$_2$) in said initial base stock being lower than 100 g/l, and the electrolyte concentration in said initial base stock being lower than 17 g/l;
   (ii.1) acidifying agent is added to said base stock until a pH value of the reaction mixture of at least approximately 7 is obtained,
   (iii.1) acidifying agent and a silicate are added simultaneously to the reaction mixture,
   a suspension which has a solids content of not more than 24% by weight is dried, and
   said process further including one of the following steps (a1) or (b1):
   (a1) after stage (iii.1), at least one aluminum compound A and then a basic agent are added to the reaction mixture, and said separation comprises a filtration and disintegration of the cake originating from this filtration, said disintegration being performed in the presence of at least one aluminum compound B,
   (b1) after stage (iii.1) a silicate and at least one aluminum compound A are added simultaneously to the reaction mixture and, when said separation comprises a filtration and disintegration of the cake originating from this filtration, the disintegration is optionally performed in the presence of at least one aluminum compound B, and wherein the composition comprises coupling agent in an amount such that the weight ratio of coupling agent to silica is at most 4%.

2. The elastomeric composition as defined by claim 1, wherein the precipitated silica is prepared by a process including the reaction of a silicate with an acidifying agent, whereby a suspension of precipitated silica is obtained, then the separation and the drying of this suspension, in which:
   the precipitation is carried out in the following manner:
   (i.1) an initial base stock comprising a silicate and an electrolyte is formed, the silicate concentration (expressed as SiO$_2$) in said initial base stock being lower than 100 g/l and the electrolyte concentration in said initial base stock being lower than 17 g/l,
   (ii.1) acidifying agent is added to said base stock until a pH value of the reaction mixture of at least approximately 7 is obtained,
   (iii.1) acidifying agent and a silicate are added simultaneously to the reaction mixture,
   then the following successive stages are performed:
   (iv.1) at least one aluminum compound A is added to the reaction mixture,
   (v.1) a basic agent is added to the reaction mixture until a pH value of the reaction mixture of from 6.5 to 10 is obtained,
   (vi.1) acidifying agent is added to the reaction mixture, until a pH value of the reaction mixture of from 3 to 5 is obtained,
   the separation comprises a filtration and disintegration of the cake originating from the filtration, the disintegration being performed in the presence of at least one aluminum compound B,
   a suspension having a solids content of at most 24% by weight is dried.

3. The elastomeric composition as defined by claim 1, wherein the precipitated silica is prepared by a process including the reaction of a silicate with an acidifying agent, whereby a suspension of precipitated silica is obtained, then the separation and the drying of this suspension, in which the precipitation is carried out in the following manner:
   (i.1) an initial base stock is formed comprising a silicate and an electrolyte, the silicate concentration (expressed as SiO$_2$) in said initial base stock being lower than 100 g/l and the electrolyte concentration in said initial base stock being lower than 17 g/l,
   (ii.1) acidifying agent is added to said base stock until a pH value of the reaction mixture of at least approximately 7 is obtained,
   (iii.1) acidifying agent and a silicate are added simultaneously to the reaction mixture, and then
   (vii.1) a silicate and at least one aluminum compound B are added simultaneously to the reaction mixture,
   and in which a suspension having a solids content of at most 24% is dried.

4. An elastomeric composition (C2) containing at least one butadienic elastomer E comprising a precipitated silica S2 as at least one reinforcing filler and at least one coupling agent, wherein:

the butadienic elastomer E comprises a functionalized butadienic elastomer prepared in solution, which is modified by at least one polyfunctional coupling agent having an alkoxysilane group; and the precipitated silica is prepared by a process including the reaction of a silicate of alkali metal M with an acidifying agent, whereby a suspension of precipitated silica is obtained, then the separation and the drying of this suspension, in which the precipitation is carried out in the following manner:

(i.2) an initial base stock comprising a silicate of alkali metal M is formed, the silicate concentration (expressed as $SiO_2$) in said initial base stock being lower than 20 g/l, (ii.2) acidifying agent is added to said base stock until at last 5% of the quantity of $M_2O$ present in said base stock is neutralized, (iii.2) acidifying agent and a silicate of alkali metal M are added simultaneously to the reaction mixture such that the ratio of the quantity of silicate added (expressed as $SiO_2$)/the quantity of silicate present in the initial base stock (expressed as $SiO_2$) is greater than 4 and at most 100, said process including one of the following two operations (a2) or (b2):

(a2) at least one aluminum compound A and then a basic agent are added to the reaction mixture after stage (iii.2), said separation comprising a filtration and disintegration of the cake originating from this filtration, said disintegration being performed in the presence of at least one aluminum compound B, (b2) a silicate and at least one aluminum compound A are added simultaneously to the reaction mixture after stage (iii.2) and, when said separation comprises a filtration and disintegration of the cake originating from this filtration, the disintegration is optionally performed in the presence of at least one aluminum compound B, and wherein the composition comprises coupling agent in an amount such that the weight ratio of coupling agent to silica is at most 4%.

5. The elastomeric composition as defined by claim 4, wherein the precipitated silica is prepared by a process including the reaction of a silicate with an acidifying agent, whereby a suspension of precipitated silica is obtained, then the separation and the drying of this suspension, in which:

the precipitation is carried out in the following manner:

(i.2) an initial base stock comprising a silicate of alkali metal M is formed, the silicate concentration (expressed as $SiO_2$) in said initial base stock being lower than 20 g/l, (ii.2) acidifying agent is added to said base stock until at least 5% of the quantity of $M_2O$ present in said base stock is neutralized, (iii.2) acidifying agent and a silicate of alkali metal M are added simultaneously to the reaction mixture such that the ratio of the quantity of silicate added (expressed as $SiO_2$)/the quantity of silicate present in the initial base stock (expressed as $SiO_2$) is greater than 4 and at most 100, then the following successive stages are performed:

(iv.2) at least one aluminum compound A is added to the reaction mixture, (v.2) a basic agent is added to the reaction mixture until a pH value of the reaction mixture of from 6.5 to 10 is obtained, (vi.2) acidifying agent is added to the reaction mixture until a pH value of the reaction mixture of from 3 to 5 is obtained, the separation comprises a filtration and disintegration of the cake originating from the filtration, the disintegration being performed in the presence of at least one aluminum compound B.

6. The elastomeric composition as defined by claim 4, wherein the precipitated silica is prepared by a process including the reaction of a silicate with an acidifying agent, whereby a suspension of precipitated silica is obtained, then the separation and the drying of this suspension, in which the precipitation is carried out in the following manner:

(i.2) an initial base stock is formed comprising a silicate of alkali metal, the silicate concentration (expressed as $SiO_2$) in said initial base stock being lower than 20 g/l, (ii.2) acidifying agent is added to said base stock until at least 5% of the quantity of $M_2O$ present in said base stock is neutralized, (iii.2) acidifying agent and a silicate of alkali metal M are added simultaneously to the reaction mixture such that the ratio of the quantity of silicate added (expressed as $SiO_2$)/the quantity of silicate present in the initial base stock (expressed as $SiO_2$) is greater than 4 and at most of 100, (vii.2) a silicate and at least one aluminum compound A are simultaneously added to the reaction mixture.

7. The elastomeric composition as defined by claim 5, wherein no electrolyte is added during the preparation of the precipitated silica.

8. The elastomeric composition as defined by claim 1, wherein the precipitated silica contains at least 0.45% by weight of aluminum.

9. The elastomeric composition as defined by claim 8, wherein the aluminum compound A comprises an organic or inorganic aluminum salt, the organic salt being selected from among the salts of carboxylic or polycarboxylic acids and the inorganic salt being selected from among the halides, oxyhalides, nitrates, phosphates, sulphates and oxysulphates.

10. The elastomeric composition as defined by claim 9, wherein the aluminum compound A comprises an aluminum sulphate.

11. The elastomeric composition as defined by claim 5, wherein the aluminum compound B comprises an alkali metal aluminate.

12. The elastomeric composition as defined by claim 1, wherein said separation includes a filtration performed by means of a filter press.

13. The elastomeric composition as defined by claim 1, wherein said drying is performed by spraying.

14. The elastomeric composition as defined by claim 1, wherein said drying is performed by means of a nozzle spray-dryer.

15. An elastomeric composition (C3) comprising at least one butadienic elastomer E, which contains a precipitated silica S3 as at least one reinforcing filler and at least one coupling agent, wherein:

the butadienic elastomer E comprises a functionalized butadienic elastomer prepared in solution, which is modified by at least one polyfunctional coupling agent having an alkoxy silane group;

the precipitated silica S3 has:

a CTAB specific surface of from 140 to 200 $m^2/g$, a BET specific surface of from 140 to 200 $m^2/g$, a DOP oil uptake lower than 300 ml/100 g, a median diameter (Ø₅₀), after disintegration with ultrasound, smaller than 3 μm, an ultrasonic disintegration factor ($F_D$) higher than 10 ml, and an aluminum content of at least 0.45% by weight, and wherein the composition comprises coupling agent in an amount such that the weight ratio of coupling agent to silica is at most 4%.

16. The elastomeric composition as defined by claim 15, wherein the precipitated silica has a pore distribution such that the pore volume of the pores whose diameter is from 175 and 275 Å represents at least 50% of the pore volume of the pores of diameters which are smaller than or equal to 400 Å.

17. An elastomeric composition (C4) comprising at least one butadienic elastomer E, which contains a precipitated silica S4 as at least one reinforcing filler and at least one coupling agent, wherein:

the butadienic elastomer E comprises a functionalized butadienic elastomer prepared in solution, which is modified by at least one polyfunctional coupling agent having an alkoxy silane group;

the precipitated silica has:

a CTAB specific surface of from 100 to 240 m²/g, a DOP oil uptake lower than 300 ml/100 g, a pore distribution such that the pore volume of the pores whose diameter is from 175 and 275 Å represents less than 50% of the pore volume of the pores of diameters which are smaller than or equal to 400 Å, a median diameter (Ø₅₀), after disintegration with ultrasound, smaller than 5 μm, and an aluminum content of at least 0.45% by weight, and wherein the composition comprises coupling agent in an amount such that the weight ratio of coupling agent to silica is at most 4%.

18. The elastomeric composition as defined by claim 15, wherein the precipitated silica has an aluminum content ranging from 0.50% to 1.50% by weight.

19. The elastomeric composition as defined by claim 15, wherein the precipitated silica is introduced in the composition in at least one of the following forms: substantially spherical beads having a mean size of at least 80 μm, powder with a mean size of at least 15 μm, granules of at least 1 mm in size.

20. The elastomeric composition as defined by claim 15, wherein the precipitated silica is in the form of substantially spherical beads having a mean size of at least 100 μm.

21. The elastomeric composition as defined by claim 1, wherein the butadienic elastomer E comprises said functionalized butadienic elastomer prepared in solution in an amount of at least 35% by weight, based on the total weight of butadiene elastomers in the composition.

22. The elastomeric composition as defined by claim 1, wherein said functionalized butadienic elastomer present in butadienic elastomer E is modified by a polyfunctional group selected from among:

an alkoxy silane;
an alkoxy silane sulfide; and
a polyfunctional coupling agent having the following general formula (I):

wherein:

each X group independently denotes a halogen atom;

each R group independently denotes a hydrocarbon radical having 1 to 20 carbon atoms;

each R' group independently denotes a group selected from an alkyl radical having 1 to 20 carbon atoms, an halogenated alkyl radical having 1 to 20 carbon atoms and an aryl radical having 6 to 20 carbon atoms;

m denotes 1, 2, 3 or 4 and n denotes 0, 1 or 2, with the proviso that the sum (m+n) is 2, 3 or 4.

23. The elastomeric composition as defined by claim 1, wherein the butadienic elastomer E comprises a functionalized butadiene-styrene copolymer prepared in solution (SSBR).

24. The elastomeric composition as defined by claim 23, wherein said functionalized butadiene-styrene copolymer prepared in solution has (a) a styrene content from 5 to 45 wt %;
(b) 20 to 80% of a microstructure 1,2-bond of butadiene portion,
(c) a glass transition temperature from −55° C. to −20° C.

25. The elastomeric composition as defined by claim 24, wherein the functionalized butadiene-styrene copolymer prepared in solution further has:

(d) 40 wt % or more of a single styrene bond and 10 wt % or less of long styrene chain which contains 8 or more styrene molecules among the total styrene.

26. The elastomeric composition as defined by claim 23, wherein the elastomer E is extended using extender oil, in an amount from 20 to 50 parts for 100 parts by weight of the total elastomer components.

27. The elastomeric composition as defined by claim 1, wherein said composition is in the crude state or in the vulcanized state.

28. A rubber article comprising at least one elastomeric composition as defined by claim 1.

29. A tire comprising a rubber article as defined by claim 28.

30. A tire tread comprising at least one elastomeric composition as defined by claim 1.

31. A tire comprising a tire tread as defined by claim 30.

32. The composition of claim 1, wherein the weight ratio of coupling agent to silica is at most 3%.

33. The composition of claim 4, wherein the weight ratio of coupling agent to silica is at most 3%.

34. The composition of claim 15, wherein the weight ratio of coupling agent to silica is at most 3%.

35. The composition of claim 17, wherein the weight ratio of coupling agent to silica is at most 3%.

* * * * *

UNITED STATES PATENT AND TRADEMARK OFFICE
CERTIFICATE OF CORRECTION

| | |
|---|---|
| PATENT NO. | : 8,268,921 B2 |
| APPLICATION NO. | : 11/794098 |
| DATED | : September 18, 2012 |
| INVENTOR(S) | : Philippe Cochet et al. |

It is certified that error appears in the above-identified patent and that said Letters Patent is hereby corrected as shown below:

On Title page, please correct Section (75) "Philippe Cochet, Lyons (FR)" to read --Philippe Cochet, Lyon (FR)--

On Title page, please correct Section (73) "Rhodia Chimie, Auberbilliers (FR)" to read --Rhodia Chimie, Aubervilliers (FR)--

On Title page, please correct Section (30) "04293106" to read --04293106.3--

Signed and Sealed this
Twelfth Day of February, 2013

Teresa Stanek Rea
*Acting Director of the United States Patent and Trademark Office*